United States Patent Office 3,770,648
Patented Nov. 6, 1973

3,770,648
ANHYDROUS AEROSOL FOAM
Leonard Mackles, New York, N.Y., assignor to Bristol-Myers Company, New York, N.Y.
No Drawing. Filed July 12, 1971, Ser. No. 161,869
Int. Cl. C09k 3/30
U.S. Cl. 252—305
5 Claims

ABSTRACT OF THE DISCLOSURE

A pressurized aerosol container in which is included a substantially anhydrous aerosol foaming composition adapted to produce a quick breaking foam and comprising a foamable liquid and a silicone resin as foaming agent.

This invention relates to a clear, substantially non-aqueous, stable "quick breaking" aerosol foaming composition contained in an aerosol dispenser. More particularly, it concerns a composition of the aforementioned type which employs a silicone resin as a foaming agent.

In many applications of aerosol technology it is important to be able to dispense a stable "quick breaking," substantially anhydrous aerosol foam. A stable foam is distinguished from an unstable foam and is characterized by the fact that it will not readily collapse and disappear when dispensed onto a surface from an aerosol. It retains its integrity as a foam over relatively long periods of time if left undisturbed. A "quick breaking" foam, on the other hand, is distinguished from a "non-breaking" or "slow breaking" foam and relates to the behavior of the foam towards sheering action as is encountered when a foam is rubbed into or spread over a surface on which it has been deposited. A "quick breaking" foam is one in which the foam is readily dissipated by a sheering or rubbing action leaving behind a film or coating of material over the surface on which it has been distributed.

From the above discussion, it is clear that a foam may be both stable and "quick breaking." It is characteristic of the present invention to provide foams which have both these characteristics.

In anhydrous applications of aerosol technology water is detrimental to its end purpose and must be substantially eliminated from the composition for any of a number of reasons. For example, water may be reactive with or otherwise incompatible with other components of the composition. Furthermore, the presence of water may be contraindicated by virtue of the intended final use of the product.

It is also highly desirable in these compositions that the entire mixture while in the container remains as a clear homogeneous compostion in storage i.e. that there be no separation of a solid phase in the aerosol dispenser. The advantage of this is that it eliminates the need for "shake well" instructions on the container and otherwise avoids the problem of foam variation encountered with the "shake well" preparations.

The formulation of certain anhydrous aerosol foaming compositions has already been suggested in the prior art. Paul A. Sanders in an article entitled "Stabilization of Aerosol Emulsions and Foams," J. Soc. Cosmet. Chem., 21, 377–391 (May 27, 1970) describes the preparations of two types of non-aqueous aerosol foaming systems; one utilizing glycol and the other mineral oil. Sanders further discloses the use of a number of polyethylene glycol ether surfactants of his composition. However, he notes "In no case was a foam obtained when the surfactant was soluble in the glycols or in mineral oil. The solubility of the surfactant in the glycols or mineral oil, therefore, appears to be one of the major factors governing the stability of foams from non-aqueous systems." (p. 385.) The implication from the Sanders article is that of necessity only cloudy anhydrous aerosol foaming systems are possible i.e. only system in which the surfactant is insoluble in the system and consequently can be present only as particles of material temporarily suspended in the liquid medium of the system.

It has also been suggested in the U.S. patent to Keil 3,511,788 that certain organic liquids having a particular minimum surface tension may be foamed by mixing them with certain silicone polymers and then expanding the mixture so formed by means of chemical blowing agents, bubbling of gas into the material or by mechanically beating a gas into the material. However, there is no suggestion in Keil of incorporating the organic liquid and silicone polymer in an aerosol dispenser together with a high vapor pressure propellant system or that this material could be dispensed from an aerosol container containing said high vapor pressure propellant system as a "quick breaking" foam.

In Example 4 of this patent, Keil describes the preparation of a so-called "one shot foam." This involves mixing tall oil, a polyfunctional hydroxy compound, i.e. N,N,N′,N′ tetrabis (2-hydroxypropyl)-ethylenediamine; trichlorofluoromethane and a diisocyanate (e.g.

$OCHC_6H_4CH_2C_6H_4NCO$).

It also describes the preparation of a foam wherein, in addition to the above ingredients, certain silicone polymers are added to the mixture. It is clear, however, that this example does not provide a "quick breaking" foam. On the contrary, it apparently forms a "non-breaking" permanent spongelike polyurethane structure by virtue of the reaction of the polyhydroxy compound and the diisocyanate present in the mixture. Moreover, there is no indication that this composition was intended to be or could possibly be dispensed from an aerosol can as a foam.

It has now been found that a stable, clear, anhydrous, "quick breaking" aerosol foaming composittion may be prepared in an aerosol container by mixing a foamable organic liquid, with certain silicone resins and a high vapor pressure propellant system; said silicone resin being soluble in said mixture. It has also been unexpectedly found that the silicone resin does not alter the hydrophobic-hydrophilic character of the foamable organic liquid employed. Thus, for example, the hydrophobic character of mineral oil is not altered by using the silicone resin as the foaming agent so that when the oil is applied to the skin it is not readily washed off. This is to be contrasted with the surfactants employed by Sanders in the reference noted above which have a definite effect on the hydrophobic character of mineral oil.

It is, accordingly, an object of the present invention to provide a stable, clear, substantially non-aqueous, "quick breaking" aerosol foaming composition suitable for being dispensed from an aerosol container.

Other and more detailed objects of this invention will be apparent from the following description and claims.

The silicone resins which are useful for the purposes of the present invention belong to a class of solid polymers which can be described generally as copolymers of $SiO_2$ units and one or more $R'(R)_2 SiO_{1/2}$ units in which R' is lower alkyl, H or an organic solubilizing group and R is lower alkyl. When R or R' is a lower alkyl group, it may be any of a variety of groups including methyl, ethyl, propyl, isopropyl, butyl, isobutyl, etc. When R' is an organic solubilizing group, it may also be any one of a large number of such groups. These include carboxyl, ester, amine, mercapto, halohydrocarbon, nitrile, nitro, carbonyl and higher hydrocarbon groups.

The unit $SiO_2$ mentioned above is a tetravalent unit which may be represented graphically as

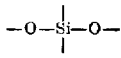

This will occupy an intermediate position in the polymer either on the central chain or on a side chain. The unit $R'(R)_2 SiO_{1/2}$ is a monovalent unit which may be described structurally as

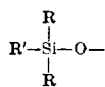

As a monovalent unit, it will occupy only terminating positions on the central chain or side chain of the polymer.

The resins employed in this invention are well-known materials. They can be prepared, for example, by the cohydrolysis of $(CH_3)_3SiX$ and/or $Q(CH_3)_2SiX$ with $SiX_4$, wherein X is a hydrolyzable radical such as a halogen (chlorine, fluorine, bromine) or any alkoxy (methoxy, ethoxy, propoxy, butoxy, etc.). Alternatively, a resin can be prepared, for example, by reacting $(CH_3)_3SiCl$, $(CH_3)_3SiOC_2H_5$ or $(CH_3)_3SiOSi(CH_3)_3$ with an acidic silica sol. Such a method is fully described in U.S. Pat. 2,676,182, the disclosure of said patent being incorporated herein by reference.

A particularly useful means for preparing modified resins containing both $(CH_3)_3SiO_{1/2}$ and $R'(CH_3)_2SiO_{1/2}$ units comprises cohydrolyzing a mixture of $(CH_3)_3SiX$ and $H(CH_3)_2SiX$ with $SiX_4$ and then coupling the desired solubilizing group R' to the copolymer by reacting the hydrogen on the silicone with the unsaturated group of a compound that also contains the desired solubilizing group. This type of reaction is also well known to those skilled in the art and is illustrated in the examples of U.S. Pat. 3,511,788.

The solid silicone resins produced by the processes described above and useful in the present invention are complex mixtures of polymers having varying chain lengths and molecular weights. In any one reaction batch, therefore, there is produced a mixture of polymers in which the ratio of monomers may be related in a particular fashion; however, the polymers will be of a variety of chain lengths and molecular weights. In a typical situation, the average molecular weight of the resin is of the order of from about 5000 to 8000.

The ratio of $SiO_2$ units to $R'(R)_2SiO_{1/2}$ units contained in the silicone resins that are useful in this invention can vary widely. In general, however, it will fall within the range of from about 1:33 to 1:1.2.

In one preferred form of this invention the silicone resin employed is defined as a copolymer of $SiO_2$ units and units selected from the group consisting of $(CH_3)_3SiO_{1/2}$ and $R'(CH_3)_2SiO_{1/2}$ units, wherein R' is a radical containing a solubilizing group and the ratio of $SiO_2$ units to the total $(CH_3)_3Si_{1/2}$ and $R'(CH_3)_2Si_{1/2}$ units is in the range of 1:0.6 to 1:1.2. In another preferred form of this invention the solid silicone copolymer is composed of $SiO_2$ units and $(CH_3)_3SiO_{1/2}$ units in which these stand in the ratio of 1:.33.

The quantity of silicone resin used in the present invention will also vary somewhat. However, sufficient resin is employed to insure that the material coming out of the aerosol container will be in the form of a stable and "quick breaking" foam as defined above. Ordinarily, it will constitute between about 0.1% to 10.0% by weight of the total aerosol composition.

Silicone resins useful for the present purposes are available commercially in the form of 50% solutions in organic solvent carriers. Typical among these carrier solvents are toluene, dimethyl silicone fluids, xylene, dioctyl phthalate, isopropyl myristate, hexadecyl alcohol, dioctyl sebacate, mineral oil (40/43 SSU). Since these resin solutions are soluble in the propellant system utilized in this invention, they may be employed in readily incorporating the silicone polymer into the aerosol foamable combinations.

In preparing the aerosol foamable compositions of the present invention in addition to the propellant system and silicone resin foaming agent, there must also be a foamable liquid. The types of liquids that can be used for this purpose are quite varied and the particular liquid selected is of no great critical significance. The only requirement is that it be a liquid which is foamable in combination with the aerosol propellants and silicone polymers. Typical among the organic liquids which are useful for the present purposes include: hydrocarbon oils e.g. mineral oil, petroleum oils, liquid petrolatums; petroleum solvents; fatty acid esters e.g. isopropyl myristate, isopropyl palmitate, butyl stearate, glycol dioleate, dioctyl sebacate, etc.; non-oil hydrocarbon liquids e.g. Humble No. 585 Cosmetic Liquid; edible oils e.g. coconut oil, peanut oil, soybean oil, linseed oil, etc.; fatty acids e.g. coconut fatty acid, oleic acid, isostearic acid, lauric acid, etc.; fatty alcohols e.g. lauryl alcohol, oleyl alchohol, hexadecyl alcohol, etc.; aliphatic alcohols e.g. 95% ethyl alcohol, 95% isopropyl alcohol; liquid surfactants e.g. polyethylene 400 dioleate, alkanolamides, polyoxyethylene oleyl ethers, sorbitan esters, phosphate esters, polyoxyethylene sorbitan esters, etc.; polyalkylene glycol e.g. Ucon fluids Ucon LB, Ucon 50 HB, Ucon 75H [these are reaction products of butyl alcohol+propylene oxide; butyl alcohol+propylene oxide and ethylene oxide (50%/50%); and butyl alcohol+propylene oxide (25%) and ethylene oxide (75%)]; mixtures of organic liquids e.g. chlorinated hydrocarbons+mineral oil, methyl salicylate, homo menthyl salicylate, etc.; dimethyl silicone fluids.

The quantity of foamable liquids that will be contained in the foamable composition of this invention may also vary somewhat. Ordinarily, it will usually constitute from 40.0% to 95% by weight of the total aerosol composition.

The third necessary component of the present foamable aerosol composition is, of course, the propellant system. This may be a single propellant or a combination of propellants. To insure the production of a proper foam, it is desirable to use the so-called "high pressure" propellants i.e. a propellant that has a relatively high vapor pressure at ordinary temperatures. The propellants of choice can be classified as fluorocarbon propellants and liquified petroleum gases. They have a vapor pressure at 70° F. of no less than 60 p.s.i.g. They are as follows:

Fluorocarbon propellants. — Chlorodifluoromethane ($CHClF_2$), V.P. 121.4 p.s.i.g. at 70° F.; chloropentafluoroethane ($CClF_2CF_3$), V.P. 103.0 p.s.i.g. at 70° F.; dichlorodifluoromethane ($CCl_2F_2$), V.P. 70.2 p.s.i.g. at 70° F.; difluoroethane ($CH_2CHF_2$), V.P. 63.0 p.s.i.g. at 70° F.

Liquified petroleum gases.—Propane, $C_3H_8$, V.P. 110.3 p.s.i.g. at 70° F.; dimethyl ether, $(CH_3)_2O$, V.P. 63.0 p.s.i.g. at 70° F.

The above propellants can, of course, be blended with lower pressure propellants to various vapor pressures. This has been found to be unnecessary because the foamable liquid portion of the compositions will depress the vapor pressure to allow most any vapor pressure desired. Some of these lower vapor pressure propellants are: dichloromonofluoromethane, dichlorotetrafluoroethane, trichloromonofluoromethane, vinyl chloride, methylene chloride, isobutane, n-butane, etc.

The quantity of propellant making up the aerosol foamable composition of this invention will also vary somewhat. In general, however, it will constitute between about 2.0% and 60.0% by weight of the total aerosol composition.

The basic aerosol foaming composition of this invention may be used as a vehicle for any of a large variety of active materials or combinations thereof. However, where the foamable liquid itself is the active material, no additional agent need necessarily be added. As used herein, the term active material is used in its broadest sense to designate a material added to the composition to effect some end purpose. Any of a large number of active materials may be used in this connection; these include: methyl salicylate, hexachlorophene, zinc oxide, benzocaine, oil of eucalyptus, camphor, antiperspirants, homomenthyl salicylate, antibiotics, enzymes, etc.

The quantity of active ingredient component (i.e. a single ingredient or mixture of ingredients) contained in the present composition can vary widely depending on the particular ingredients selected or the intended final use of the product. In general, however, it will constitute between about 1.0% and 30.0% by weight of the total weight of the aerosol composition.

In addition to the active material component mentioned above, there may also be incorporated in the present compositions any of a variety of additives or combinations thereof commonly added to aerosol compositions or to toiletries, cosmetics, pharmaceuticals, etc. By way of illustration, mention may be made of emollients, lubricants, humectants, abrasives, perfumes, etc.

As noted above, in some instances no separate active ingredient component is added to the composition and the foamable liquid serves as this purpose. To illustrate some foamable liquids which may serve this dual function, the following may be mentioned: mineral oil, isopropyl myristate, surfactants, fatty alcohols, etc.

The present invention lends itself to the preparation of a wide variety of products. To note a few, the following may be mentioned: shower or bath oil foams, rectal wipe foams, rectal medicated foams, baby oil foams, sun screen foams, brushless shaving cream foams, dry hair shampoo foams, hand cream foams, make-up remover foams, vaginal deodorant foam wipes, analgesic foam rubs, hair grooming foams and antiperspirants.

The aerosol compositions of this invention are prepared in a very simple manner. All of the ingredients, less the propellants, are mixed until the composition is uniform to form a concentrate. The concentrate (usually in the amount of from 40% to 98% by weight of the finished composition) is charged into an aerosol can. A valve is then placed on the can and the can is crimped. The propellant is then added (2.0% to 60% by weight of the final composition) by pressure filling.

The following examples are given to further illustrate this invention. It is to be understood, however, that the invention is not limited thereto.

The following terms used in the examples and elsewhere in this specification have the meaning ascribed to them below:

(1) Silicon 908—50% solution is isopropyl myristate of resin containing $SiO_2$ units and $(CH_3)_3SiO_{1/2}$ in which the ratio of $SiO_2$ units to $(CH_3)_3SiO_{1/2}$ units is 1:33 (or 0.75 to 0.25) having an average M.W. of 5000 to 8000; hydroxy content 3 to 5% by weight based on the total weight resin and a viscosity (50% xylene solution) of 4 to 8 centistokes at 25° C.

(2) Silicone 810—50% solution in hexadecyl alcohol of resin described under "Silicone 809."

(3) Silicone 425—50% solution in dioctyl phthalate of resin described under "Silicone 809."

(4) Freon 12—dichlorodifluoromethane.

(5) Wilmar Emollient 60—mixture containing approximately 40% isopropyl myristate and 60% isopropyl palmitate.

(6) Cosmetic base is a practically odorless, colorless, stable low viscosity $C_{12}$–$C_{14}$ isoparaffin derived from specially selected feedstocks. It has a sp. gr. 20/20° C. of 0.788. Refractive index of 1.4386, distillation range of 225–225° C.

(7) Emcol 70–30X is an oleyl glycerol phosphate.

(8) Dow Corning Silicone XR6–3701 and XR8–3076 are 50% solutions of silicone resins in xylene, where the silicone resin is a copolymer of $SiO_2$ units and units selected from the group consisting of $(CH_3)_3SiO_{1/2}$ and $Q(CH_3)_2SiO_{1/2}$ units wherein Q is a radical containing a solubilizing group and the ratio of $SiO_2$ units to the total $(CH_3)_3Si$ and $Q(CH_3)_2Si$ units is in the range of 1:0.6 to 1:1.2.

(9) Polyethylene glycol (400) dioleate is an ester of polyethylene glycol (M.W. 400) with 2 moles of oleic acid.

(10) Ucon LB 1715 is a butoxy polyoxy propylene glycol.

(11) Neobee M–5—fractionated triglyceride of coconut oil ;iodine value, 2 maximum; acid No. 0.1; saponification No. 340–360.

(12) Detergent ALX–100S—diethanol amine dodecylbenzene sulfonate.

EXAMPLE 1

| Baby oil foam: | Percent |
|---|---|
| Mineral oil 55/65 SSU | 59.168 |
| White mineral oil 40/43 SSU | 20.833 |
| Silicone 809 | 3.333 |
| Freon 12 (dichlorofluoromethane) | 16.666 |
| | 100.000 |

EXAMPLE 2

| "Desitin" baby foam: | Percent |
|---|---|
| Mineral oil 55/65 SSU | 50.836 |
| Mineral oil 40/43 SSU | 20.833 |
| Hydrogenated castor oil | 4.166 |
| Zinc oxide | 4.166 |
| Silicone 809 | 3.333 |
| Freon 12 | 16.666 |
| | 100.000 |

EXAMPLE 3

| Shower and bath oil foam: | Percent |
|---|---|
| Mineral oil 40/43 SSU | 32.00 |
| Wilmar Emollient 60 | 33.15 |
| Perfume | 2.00 |
| F, D & C Dye Green No. 6 (0.2 in benzyl benzoate) | 0.45 |
| F, D & C Dye Yellow No. 11 (0.4 in benzyl benzoate) | 0.15 |
| Silicone 809 | 3.25 |
| Alcohol (anhydrous) | 13.00 |
| Freon 12 | 16.00 |
| | 100.00 |

EXAMPLE 4

| Rectal cleansing foam: | Percent |
|---|---|
| Mineral oil 40/43 SSU | 46.66 |
| Wilmar Emollient 60 | 33.25 |
| Perfume | 0.10 |
| Silicone 809 | 3.33 |
| Freon 12 | 16.66 |
| | 100.00 |

EXAMPLE 5

Medicated rectal foam:

| | Percent |
|---|---|
| Mineral oil 40/43 SSU | 45.44 |
| Wilmar Emollient 60 | 31.66 |
| Benzocaine | 1.04 |
| Oil of eucalyptus | 0.21 |
| Camphor | 1.66 |
| Silicone 809 | 3.33 |
| Freon 12 | 16.66 |
| | 100.00 |

EXAMPLE 6

Make-up remover foam:

| | Percent |
|---|---|
| Mineral oil 55/65 SSU | 41.505 |
| Cosmetic base | 40.830 |
| Silicone 4251 | 0.833 |
| Perfume | 0.166 |
| Freon 12 | 16.666 |
| | 100.000 |

EXAMPLE 7

Vaginal deodorant foam wipe:

| | Percent |
|---|---|
| Wilmar Emollient 60 | 50.00 |
| Mineral oil 40/43 SSU | 30.15 |
| Silicone 809 | 3.25 |
| Hexachlorophene | 0.20 |
| Perfume | 0.40 |
| Freon 12 | 16.00 |
| | 100.00 |

EXAMPLE 8

Analgesic foam rub:

| | Percent |
|---|---|
| Mineral oil 55/65 SSU | 69.11 |
| Methyl salicylate | 12.19 |
| Silicone 809 | 2.44 |
| Freon 12 | 16.26 |
| | 100.00 |

EXAMPLE 9

Shampoo foam:

| | Percent |
|---|---|
| Detergent ALX-100S (Mona) | 47.0 |
| Silicone 4251 | 3.0 |
| Freon 11 | 40.0 |
| Freon 12 | 10.0 |
| | 100.0 |

EXAMPLE 10

Invisible glove hand protector foam:

| | Percent |
|---|---|
| Emcol 70-30X | 4.55 |
| Dow Corning Silicone XR6-3701 | 4.55 |
| Isopropyl myristate | 72.72 |
| Freon 12 | 18.18 |
| | 100.00 |

EXAMPLE 11

Hand conditioner foam:

| | Percent |
|---|---|
| Neobee M-5 | 26.08 |
| Dow Corning Silicone XR6-3701 | 4.35 |
| Polyethylene glycol (400) dioleate | 4.35 |
| Alcohol (anhydrous) | 52.18 |
| Freon 12 | 13.04 |
| | 100.00 |

EXAMPLE 12

Hair grooming foam:

| | Percent |
|---|---|
| Ucon LB 1715 | 15.73 |
| Alcohol (anhydrous) | 62.90 |
| Dow Corning Silicone XR8-3076 | 4.71 |
| Freon 12 | 16.66 |
| | 100.00 |

EXAMPLE 13

Sun screening foam:

| | Percent |
|---|---|
| Ucon LB 1715 | 15.73 |
| Homo menthyl salicylate | 3.93 |
| Alcohol (anhydrous) | 58.96 |
| Dow Corning Silicone XR8-3076 | 4.72 |
| Freon 12 | 16.66 |
| | 100.00 |

EXAMPLE 14

Hair cleaning foam:

| | Percent |
|---|---|
| Alcohol (anhydrous) | 45.0 |
| $H_2O$ | 5.0 |
| Silicone 810 | 2.0 |
| Freon 12 | 48.0 |
| | 100.0 |

EXAMPLE 15

Antiperspirant foam:

| | Percent |
|---|---|
| Aluminum chlorohydrate | 7.00 |
| Bentonite | 3.00 |
| Isopropyl myristate | 72.00 |
| Silicone 809 | 3.00 |
| Freon 12 | 15.00 |
| | 100.00 |

EXAMPLE 16

Antiperspirant foam:

| | Percent |
|---|---|
| $AlCl_3$-$6H_2O$ | 5.00 |
| Aluminum phenol sulfonate | 5.00 |
| Ethyl alcohol (anhydrous) | 74.00 |
| Silicone 809 | 1.00 |
| Freon 12 | 15.00 |
| | 100.00 |

EXAMPLE 17

Antiperspirant foam:

| | Percent |
|---|---|
| $AlCl_3$-$6H_2O$ | 3.00 |
| Ethyl alcohol (anhydrous) | 15.00 |
| n-Propyl alcohol | 66.00 |
| Silicone 809 | 1.00 |
| Freon 12 | 15.00 |
| | 100.00 |

What is claimed is:

1. As an article of manufacture a pressurized aerosol container having therein a substantially anhydrous stable foaming composition adapted to produce a quick breaking foam when released from said container and provided with valve means for dispensing said composition; said foaming composition comprising a high pressure liquified propellant selected from the group consisting of liquified fluorocarbon propellants and liquified petroleum gases, a foamable organic liquid and solid silicone resin, said silicone resin being present in sufficient quantity in said composition to insure the production of a stable quick breaking foam and said foamable organic liquid and said resin being soluble in said propellant;

wherein said silicone resin is a copolymer of $SiO_2$ units and one or more $R'(R)_2SiO_{1/2}$ units in which
 (a) R' is lower alkyl, H or an organic solubilizing group,
 (b) R is lower alkyl;

wherein the ratio of $SiO_2$ units to $R'(R)_2SiO_{1/2}$ units is in the range of from about 1:33 to 1:1.2;

and wherein said high pressure propellant has a vapor pressure in the order of from about 60.0 to 125 p.s.i.g. at 70° F.

2. An article according to claim 1 including an additional active ingredient selected from the group consisting of methyl salicylate, hexachlorophene, zinc oxide, benzocaine, oil of eucalyptus, camphor, antiperspirants, homomenthyl salicylate, antibiotics and enzymes.

3. An article according to claim 1 wherein said silicone resin constitutes about 0.1% to 10.0% by weight of the total aerosol composition.

4. An article according to claim 3 wherein said foamable organic liquid constitutes about 40.0% to 95% by weight of the total aerosol composition.

5. An article according to claim 4 wherein said liquified propellant constitutes about 2.0% to 60% by weight of the total aerosol composition.

References Cited

UNITED STATES PATENTS

| 2,416,504 | 2/1947 | Tautman et al. | 252—358 |
| 2,868,657 | 1/1959 | Sesso | 252—305 X |
| 2,968,628 | 1/1961 | Reed | 252—305 |
| 2,993,866 | 7/1961 | Vaughn et al. | 252—305 |
| 3,215,643 | 11/1965 | Pail | 252—307 |
| 3,330,730 | 7/1967 | Hernandez | 252—305 |
| 3,511,788 | 5/1970 | Keil | 260—2.5 |

JOHN D. WELSH, Primary Examiner

U.S. Cl. X.R.

252—307

UNITED STATES PATENT OFFICE
CERTIFICATE OF CORRECTION

Patent No. 3,770,648          Dated November 6, 1973

Inventor(s) LEONARD MACKLES

It is certified that error appears in the above-identified patent and that said Letters Patent are hereby corrected as shown below:

Column 5, line 66, "Silicon 908" should read -- Silicon 809 -- . Column 6, line 1, "Silicone 425" should read -- Silicone 4251 -- .

Signed and sealed this 6th day of August 1974.

(SEAL)
Attest:

McCOY M. GIBSON, JR.          C. MARSHALL DANN
Attesting Officer              Commissioner of Patents